United States Patent [19]
Patel et al.

[11] Patent Number: 6,041,618
[45] Date of Patent: Mar. 28, 2000

[54] INSULATED PRESSURE VESSEL HOLDER

[75] Inventors: Chhotu N. Patel, Farmington Hills; Kevin L. Lueschen, Troy, both of Mich.

[73] Assignee: Automotive Fluid Systems, Inc., Troy, Mich.

[21] Appl. No.: 08/962,106

[22] Filed: Oct. 31, 1997

[51] Int. Cl.[7] ............................................. F25B 43/00
[52] U.S. Cl. ............................. 62/503; 62/239; 180/68.4
[58] Field of Search ............................. 62/503, 509, 239, 62/245, 295, 297, 457.3; 180/68.4, 68.6

[56] References Cited

U.S. PATENT DOCUMENTS

| | | |
|---|---|---|
| 1,746,406 | 2/1930 | Sawyer . |
| 2,836,965 | 6/1958 | Kleist .......................................... 62/509 |
| 3,212,289 | 10/1965 | Bottum . |
| 3,295,709 | 1/1967 | Herrick et al. . |
| 3,355,045 | 11/1967 | Douglas . |
| 4,054,985 | 10/1977 | Aleniusson . |
| 4,345,430 | 8/1982 | Pallo et al. . |
| 4,637,637 | 1/1987 | Adorjan . |
| 4,651,839 | 3/1987 | Isobe .................................. 180/68.4 X |
| 4,680,935 | 7/1987 | Murai . |
| 4,688,603 | 8/1987 | Donnerhack et al. . |
| 4,746,028 | 5/1988 | Bagg . |
| 4,875,380 | 10/1989 | Boron . |
| 4,888,962 | 12/1989 | Harper et al. . |
| 4,998,597 | 3/1991 | Bainbridge et al. . |
| 5,205,473 | 4/1993 | Coffin, Sr. . |
| 5,377,495 | 1/1995 | Daigle . |
| 5,449,035 | 9/1995 | Straehle et al. . |
| 5,479,790 | 1/1996 | Bottum . |
| 5,702,076 | 12/1997 | Humber . |

OTHER PUBLICATIONS

Automotive Air Conditioning System Clutch Cycling Thermstatic Expansion Valve System (CCTXV) (drawing).

*Primary Examiner*—Henry A. Bennett
*Assistant Examiner*—Marc Norman
*Attorney, Agent, or Firm*—Vanophem Meehan & Vanophem, P.C.

[57] ABSTRACT

An insulating mounting bracket for a pressure vessel in an engine compartment of an automobile, the pressure vessel having an elongated cylindrical sleeve having an outwardly projecting flange for attaching the pressure vessel within an engine compartment. The elongated cylindrical sleeve has a corrugated surface creating air pockets in the space between the insulating bracket and the pressure vessel contained therein. In one embodiment, the sleeve is open at both ends, in an alternate embodiment the lower end of the sleeve is narrowed and used as a connecting point. In both embodiments, the sleeve accommodates condensate run off and prevents moisture from accumulating in the air pockets. The flange has fasteners molded integral with the insulating bracket to facilitate mounting within the engine compartment.

30 Claims, 4 Drawing Sheets

INSULATED PRESSURE VESSEL HOLDER

BACKGROUND OF THE INVENTION

1. Field of the Invention

The present invention generally relates to components for use in automotive air-conditioning systems. More particularly the present invention relates to an insulated holder for use in an engine compartment of an automobile, wherein the insulated holder is designed to hold and insulate a pressure vessel of the air-conditioning system, such as an accumulator dehydrator or a receiver dryer. The overall efficiency of the vehicle air-conditioning system is significantly improved resulting in a lowering of the air temperature being blown from the ducts of the air-conditioning system within the passenger compartment of the vehicle.

2. Description of the Prior Art

One type of vehicle air-conditioning system includes a compressor, a condenser, an evaporator and an accumulator dehydrator commonly referred to as a clutch cycling orifice tube (CCOT) system. A second type of air-conditioning system has a compressor, a condenser, a receiver dryer, an evaporator and a thermostatic expansion valve (CCTXV).

In the CCOT system, the accumulator dehydrators (or accumulators) function to change liquid refrigerant fluid (which is sent to the accumulator from the evaporator) to a gaseous or vapor-laden refrigerant fluid (which is then sent to the compressor) by separating the liquid refrigerant from the gaseous refrigerant and preventing the liquid refrigerant fluid from being sent to the compressor.

In the CCTXV system, the system is designed to operate at an efficiency wherein there is only vaporous or gaseous refrigerant fluid exiting the thermostatic expansion valve (TXV) and being sent to the compressor. The receiver dryer, located after the condenser, receives a high pressure, moderate temperature liquid refrigerant fluid and functions to ensure that only liquid refrigerant is sent to the TXV.

Traditionally, the accumulator and the receiver dryer are made of a metal material having a sufficiently high strength to withstand the relatively very high pressure within the air-conditioning system. Today's accumulators and receiver dryers are more often being manufactured from aluminum and other lightweight inexpensive metal or alloy materials. However, in almost all instances the metal material has very poor insulating properties, i.e. the material is too efficient at transferring heat (in the present instance from the engine compartment to the relatively cooler refrigerant fluid located within the accumulator or receiver dryer).

In both of the above described systems, the air-conditioning system is commonly located in the engine compartment of the vehicle. Under the hood of the automobile, the engine generates a significant amount of heat. While in cold weather this is not a problem, in relatively hot weather (i.e. above approximately 80° F.), temperatures under the hood of an operating vehicle, standing still, can become extremely high, as high as 250° F. This heat buildup within the engine compartment can quickly affect the components of the air-conditioning system such that the temperature of the conditioned air felt at the duct outlet within the passenger compartment can begin to quickly rise. This results in the occupants of the vehicle becoming warm and uncomfortable. Thus, there is a significant problem with air-conditioning system performance during vehicle standstill conditions. The longer the vehicle stands still, the worse the problem becomes.

The prior art has addressed the problem of condensation forming on the exterior of a suction accumulator structure. For example, U.S. Pat. Nos. 3,212,289 and 5,479,790, to Bottum, Sr. and Bottum, Jr. et al. respectively, each disclose a combined receiver suction accumulator construction comprised of a pair of closed vessels arranged in spaced relation one within the other to define an air or vacuum space therebetween to prevent sweating of the inner vessel during its normal suction accumulator function. The '790 reference also discloses the use of air spaces provided around the ends of the accumulator's inlet and outlet tubes to preclude sweating or frosting. Both the '289 reference and the '790 reference disclose it is possible to circulate a relatively warm high pressure refrigerant fluid in the space between the vessels to function as a receiver and to exchange heat with the relatively cold low pressure refrigerant fluid in the accumulator. Thus, the '289 and '790 references teach the addition of heat into the accumulator.

Additionally, there is a continued problem with locating and securing the air-conditioning components, in particular the accumulator or the receiver dryer, within the engine compartment of the automobile. Due to significant space constraints and strength requirements, any mounting system must function to adequately secure the component in position. Several prior art alternatives have been proposed. For example, U.S. Pat. No. 4,888,962 discloses the use of a band clamp connected to a bracket for retaining an accumulator in position. The '962 patent discloses that the bracket can be connected within the engine compartment. The band clamp wraps around the outer periphery of the accumulator or receiver dryer and is tightened to retain the component.

One factor in determining the overall air-conditioning system performance is the efficiency of the accumulator (i.e. the ability of the accumulator to change liquid refrigerant fluid into vaporous and gaseous refrigerant fluid). Since the evaporator sends a low pressure liquid refrigerant to the accumulator, and the accumulator must send only a vaporous refrigerant fluid to the compressor, there is necessarily a pressure drop associated with the accumulator. Accordingly, the temperature at the vent outlet within the passenger compartment can be stated as a function of the temperature of the refrigerant fluid within the accumulator.

In view of the above, there have been several attempts in the prior art to provide an extremely efficient accumulator or receiver dryer that can be packaged in minimum space inside the engine compartment. It is desirable that the accumulator or receiver dryer efficiency remain unaffected by the extreme temperatures that build up inside the engine compartment, particularly during standstill traffic conditions.

The prior art has been unable to accomplish efficient operation and mounting in a minimum of space without significant structure that adds complexity and cost to air-conditioning systems. One solution has been to use the band clamp design of the '962 patent and wrap a flexible insulating material around the exposed surfaces of the accumulator, such as neoprene rubber. However, neoprene rubber degrades easily in the harsh engine compartment. Thus, there is still a need for an apparatus for mounting and insulating an accumulator or receiver dryer that increases the efficiency of the unit and, simultaneously, utilizes minimal packaging space. The apparatus should keep the accumulator or receiver dryer isolated from the effects of the engine environment, particularly during hot weather and standstill traffic conditions.

SUMMARY OF THE INVENTION

The present invention provides an improved apparatus for insulating and mounting an accumulator or receiver dryer that overcomes the disadvantages associated with prior art assemblies. The present invention is an insulating sleeve and integral mounting bracket for mounting a pressure vessel such as an accumulator or receiver dryer in the engine compartment of a vehicle isolating it from engine compartment heat and vehicle vibration.

The insulating structure is a generally cylindrical sleeve having inner and outer surfaces. At least the inner surface of the insulating structure is corrugated. The corrugations can take a variety of shapes such as sinuous, crenelated or scalloped. It should be pointed out that one of ordinary skill in the art may determine any other appropriate shape without departing from the scope of the present invention.

The inner surface contacts localized areas of the accumulator or receiver dryer housing creating localized air pockets running at least part of the length of the accumulator or receiver dryer. The air pockets are formed from corrugations in an inner surface of the sleeve.

The integral mounting flange is an outwardly extending projection on the outer surface of the insulating structure. The structure of the flange can vary extensively depending on the engine compartment and the accumulator or receiver dryer's packaging arrangement within the compartment.

The sleeve is open at both ends. One end is radiused and necked down to form a drain. The condensate that forms on the accumulator or receiver dryer will flow downward through the necked opening and out of the sleeve by force of gravity.

In one embodiment, the flange extends horizontally from the outer surface of the insulating structure. The horizontal flange may be cantilevered by one or more projecting structures that provide added stability for mounting and isolating the accumulator or receiver dryer from vibration. The flange is also provided with bosses and various openings to receive fasteners for mounting the bracket in the engine compartment. The fasteners can be a bolt and nut arrangement, screws, or separate "X-mas Tree" push pins or any other known fastener appropriate for connection within the engine compartment.

The sleeve with integral mounting bracket is preferably nonmetallic and should have good insulating properties. It may be rubber, plastic or any other suitable material having suitable insulating properties.

It is an object of the present invention to insulate an accumulator or receiver dryer using air pockets resulting in lower air temperature at the registers in the passenger compartment and particularly during stand-still conditions.

It is another object of the present invention to insulate and mount a vessel such as an accumulator or receiver dryer within an engine compartment.

It is yet another object of the present invention to insulate and mount an accumulator or receiver dryer within an engine compartment using a minimum of space.

It is still another object of the present invention to provide an insulating sleeve that incorporates a mounting flange.

It is a further object of the present invention to provide fasteners integral with the insulating mounting flange for fastening the insulating bracket inside the engine compartment.

It is still a further object of the present invention to provide an insulating sleeve capable of draining condensation from the outer surface of an accumulator or receiver dryer.

It is yet a further object of the present invention to provide a corrugated insulating sleeve having an integral mounting bracket for insulating and mounting an accumulator or receiver dryer within an engine compartment.

DETAILED DESCRIPTION OF THE PREFERRED EMBODIMENT

Figure 1:
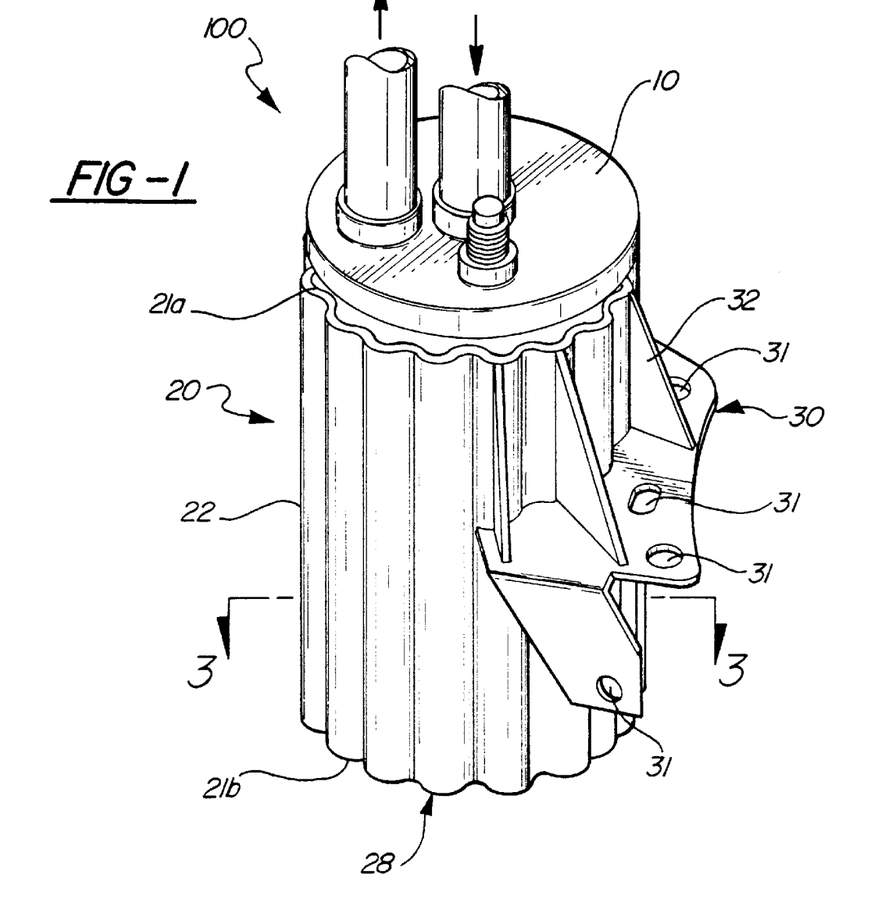
FIG. 1 is a perspective view of one embodiment of the present invention. The embodiment shown has corrugations on both the inner and outer surfaces of the insulating sleeve. The flange is supported by upwardly extending cantilevered projections.

Referring generally to FIGS. 1–7 and first to FIG. 1, an assembly of the present invention 100 is shown including an accumulator 10 and an insulating bracket 20. The insulating bracket 20 is designed to mount the accumulator 10 in a vehicle's engine compartment and isolate the accumulator 10 from the harsh vibrations and heat generated by the engine. The invention is suitable for mounting and insulating any pressure vessel, and is shown holding an accumulator 10.

The insulating bracket 20 has a top 21a and a bottom 21b, both of which are preferably open. The inner diameter of the insulating bracket 20 is designed to be only slightly larger than the outer diameter of the accumulator 10, whereby the accumulator 10 is press fit into the insulating bracket 20. The insulating bracket 20 is then mounted within the engine compartment.

The geometry of the insulating bracket 20 is designed so the accumulator 10 is insulated from the excessive heat generated within the engine compartment during standstill conditions such as stop lights and congested traffic. Specifically, the insulating bracket 20 includes an elongated cylindrical sleeve 22 that nearly completely surrounds the accumulator 10.

The elongated cylindrical sleeve 22 of the preferred embodiment has alternating scalloped-shaped corrugations 23. The crests 23a of the corrugations 23 contact the outer surface of the accumulator 10. The valleys 23b of the corrugations 23 are spaced from the outer surface of the accumulator 10 creating an air pocket 24 in the space between the valley 23b of the corrugation 23 and the outer surface of the accumulator 10.

Air is a known insulator. The air pockets 24 block the convective flow of heat and conduction of heat through exposure to the high temperatures emitted from the engine, muffler, etc. of a automotive vehicle. The air pockets 24 of the insulating bracket 20 isolate the accumulator 10 from the heat inside the engine compartment.

The corrugations 23 on the surface of the insulating bracket 20 that form the air pockets 24 can have various configurations. In the embodiment shown in FIG. 1, the entire elongated cylindrical sleeve 22 has corrugations 23. The elongated cylindrical sleeve 22 has corrugations 23 on its inner and outer surfaces.

Figure 4:
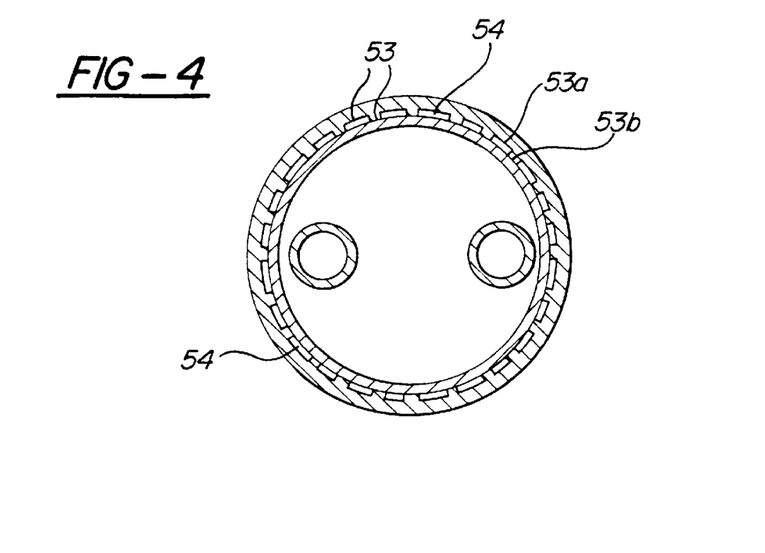
FIG. 4 is a cross-sectional view of the present invention taken along line 4—4 of FIG. 2 detailing the insulating air pockets.

Another embodiment of the present invention including an alternative insulating bracket 50 and the accumulator 10 is shown in FIG. 4. In this embodiment, only the inner surface of the elongated cylindrical sleeve 52 of the insulating bracket 50 has corrugations 53. The outer surface of the insulating bracket 50 remains generally smooth. The inner surface has corrugations 53 spaced around the entire circumference.

Each of the corrugations 53 has a crest 53a in contact with the outer surface of the accumulator 10 and a valley 53b located between each corrugation 53 and spaced from the outer surface of the accumulator to form an air pocket 54.

Figure 3:
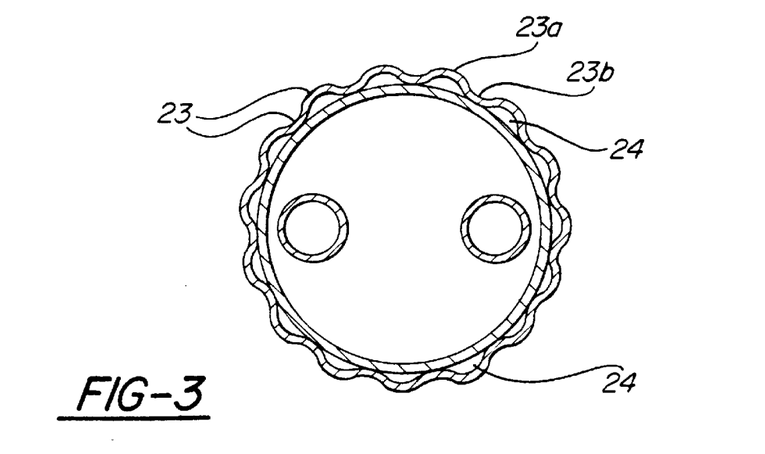
FIG. 3 is a cross-sectional view of the present invention taken along line 3—3 of FIG. 1 detailing the insulating air pockets.

The corrugations 23 and 53 can take various shapes. For example, FIG. 3 shows a cross section of the elongated cylindrical sleeve 22 wherein the outer periphery of the cylindrical sleeve 22 is a sinuous profile. FIG. 4 shows a cross section of the embodiment of the cylindrical sleeve 52 having a crenelated profile for the corrugations 53.

Figure 7:
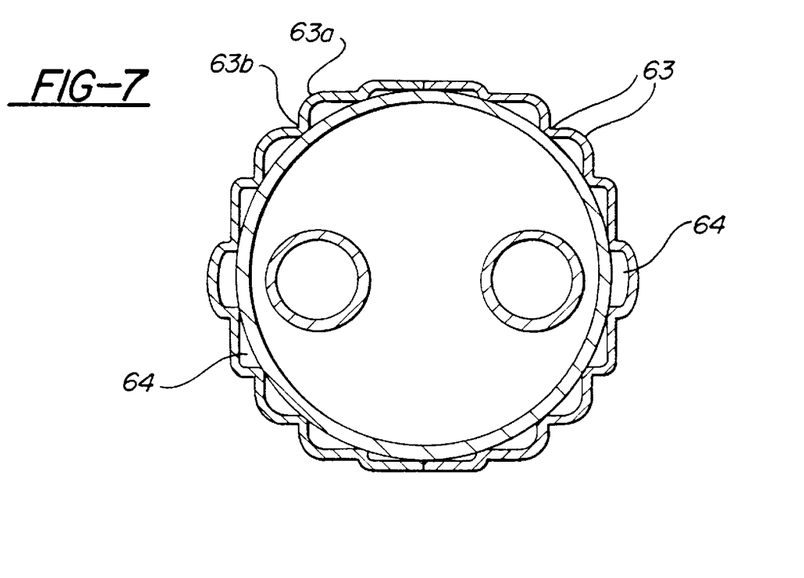
FIG. 7 is a cross-sectional view of the present invention taken along line 7—7 of FIG. 6.

In yet another embodiment shown in FIG. 7, the insulating bracket 60 has a cross-sectional profile that is scalloped, as shown at 63. The scalloped profile of FIG. 7 shows adjacent scallops 63 having a distinct shape and radius. The varying radii of the scallops 63 create adjacent air pockets 64 that have shapes distinct from one another.

The present invention makes clear it is advantageous to insulate the accumulator from the heat generated within the engine compartment to improve the performance of a vehicle's air-conditioning system. The refrigerant fluid inside the accumulator is protected from the heat of the engine and remains cooler than it would have without insulation. When the refrigerant fluid subsequently leaves the insulated accumulator 10, it is capable of providing greater cooling effect to air passing over the heat exchanger into the passenger compartment than a non-insulated accumulator would provide during stand-still conditions. However, when the warm air cools down, the water vapor condenses into liquid. The air pockets of the insulating bracket 20, 50, 60 will help buffer the temperature difference but will not completely eliminate condensation from forming on the accumulator.

The opening at the bottom end 21b of the insulating bracket 20 allows moisture to run off the accumulator 10 and exit the opening in the end 21b to prevent condensation from building up and settling around the accumulator 10. In the embodiment shown in FIG. 1, the bottom end 21b has an opening 28 the same size as the diameter of the insulating bracket 20, and the condensation runs directly down the inner sides of the insulating bracket 20 and the outer surface of the accumulator 10.

Figure 2:
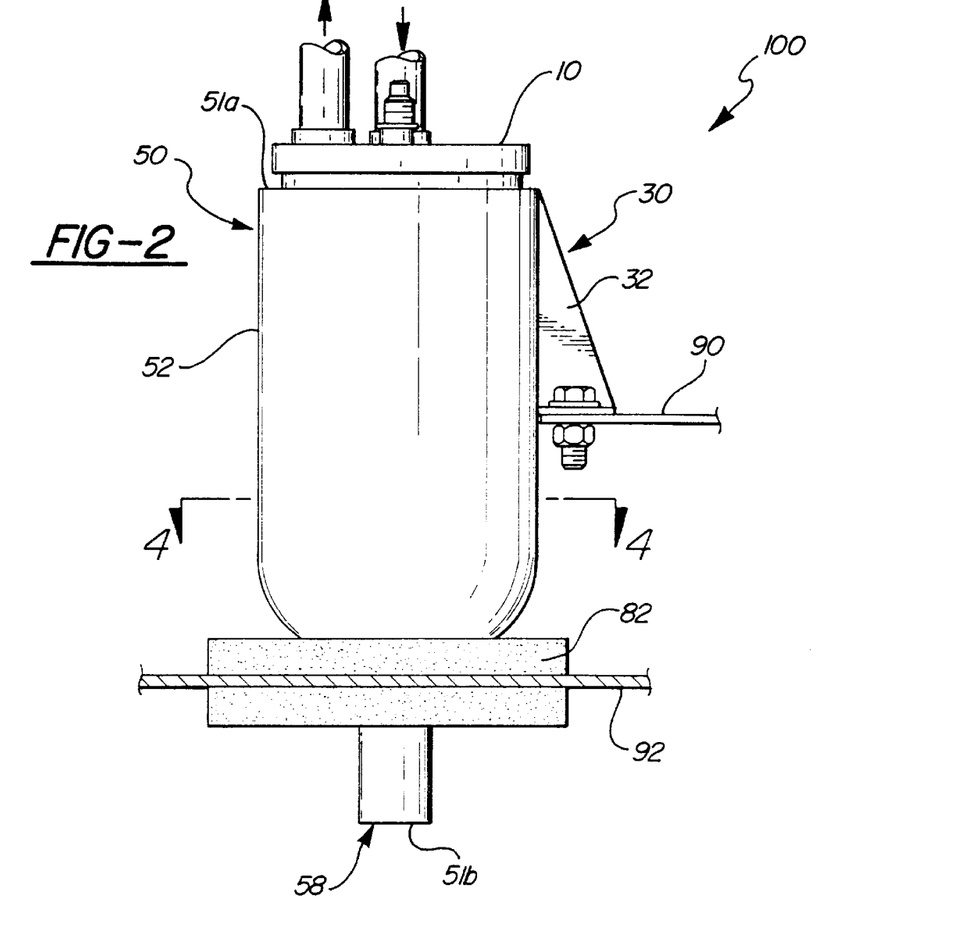
FIG. 2 is a side view of another embodiment of the present invention detailing the corrugations on the inner surface of the insulating sleeve. The drain for condensate and a gasket for mounting purposes and noise reduction are also shown.

In the embodiment shown in FIG. 2, the opening 58 at the bottom end 51b of the insulating bracket 50 is necked down or narrowed. The necked bottom end 51b is radiused and directs the moisture out of the narrowed opening 58. The necked bottom end 51b is also useful for mounting purposes as will be discussed supra.

The insulating brackets 20, 50, 60 also mount the accumulator within the engine compartment. An integral flange 30 outwardly projects from the elongated cylindrical sleeve 22, 52, 62 respectively in each embodiment.

In the embodiment shown in FIG. 1, the flange 30 has an outwardly projecting member cantilevered from the elongated cylindrical sleeve by upwardly-aligned projections 32 located on top of the flange 30. The flange 30 has openings 31 for receiving fasteners (not shown). The flange 30 can be bolted or screwed to a surface 90 inside the engine compartment as shown in FIG. 2.

Figure 6:
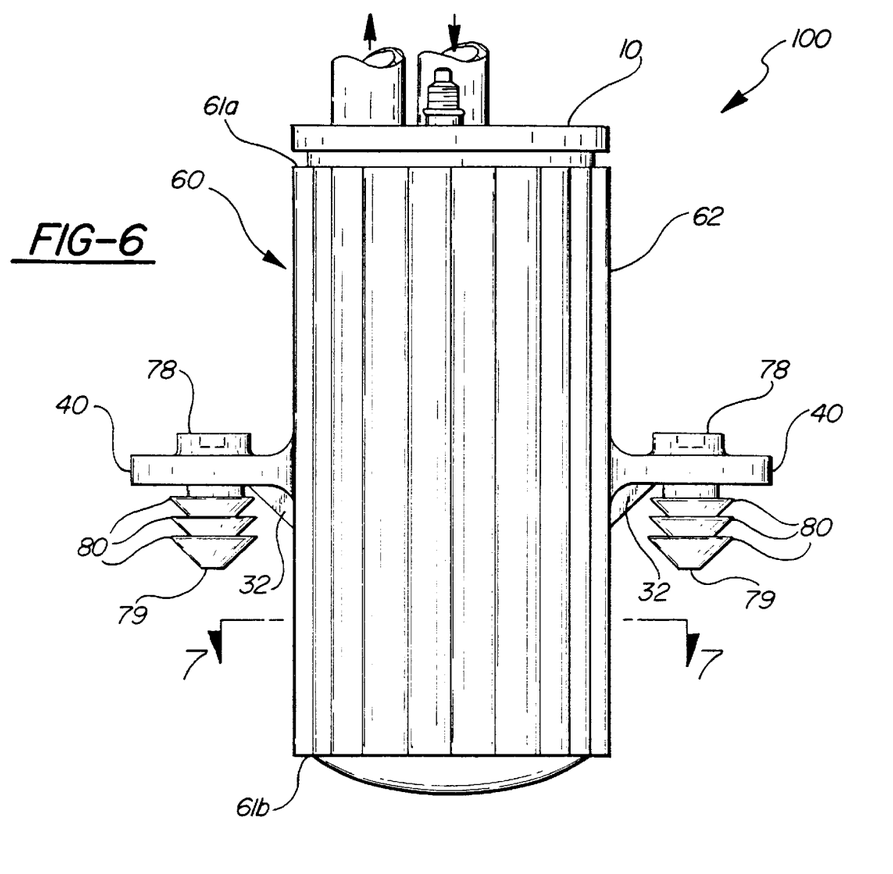
FIG. 6 is a perspective view of yet another embodiment of the present invention detailing the distinct scallops on the insulating sleeve and the mounting flange provided with integral "X-mas tree" type push pin fasteners.

In an alternative embodiment shown in FIG. 6, the flange 40 has outwardly projecting members on either side of the elongated cylindrical sleeve 62. Each of the outwardly projecting members 40 are cantilevered from the elongated cylindrical sleeve 62 by upward standing projections 32 located underneath the flange 40. The flange 40 has fasteners 78 molded integral with the insulating sleeve 62 and flange 40. In the embodiment shown in FIG. 6, the flange 40 has integrally molded "X-mas tree" style push pins 78. However, any suitable fastener will accomplish the same objective.

The "X-mas tree" style push pin fasteners 78 have a tapered end 79. Annular notches 80 on the tapered end 79 allow the push pin fastener 78 to be inserted into a mounting hole (not shown) on the surface of the engine compartment. The tapered end 79 collapses slightly under pressure during insertion. The annular notches 80 expand when pressure is relieved and engage the surface of the engine compartment. The outer diameter of the annular notches 80 is slightly larger than the outer diameter of the mounting hole (not shown). Therefore, the push pin fastener 78 can be inserted in only one direction, and the notches 80 prevent the removal of the push pin fastener 78.

The flange 30, 40 is generally supported by upwardly-aligned projections 32. The projections 32 can be located above the flange 30 as shown in FIG. 1, or below the flange 40 as shown in FIG. 6, depending on the molding requirements. In either arrangement, the upward standing projections 32 provide support and rigidity to the flange 30, 40 and the insulating bracket 20, 50, 60 overall.

Figure 5:
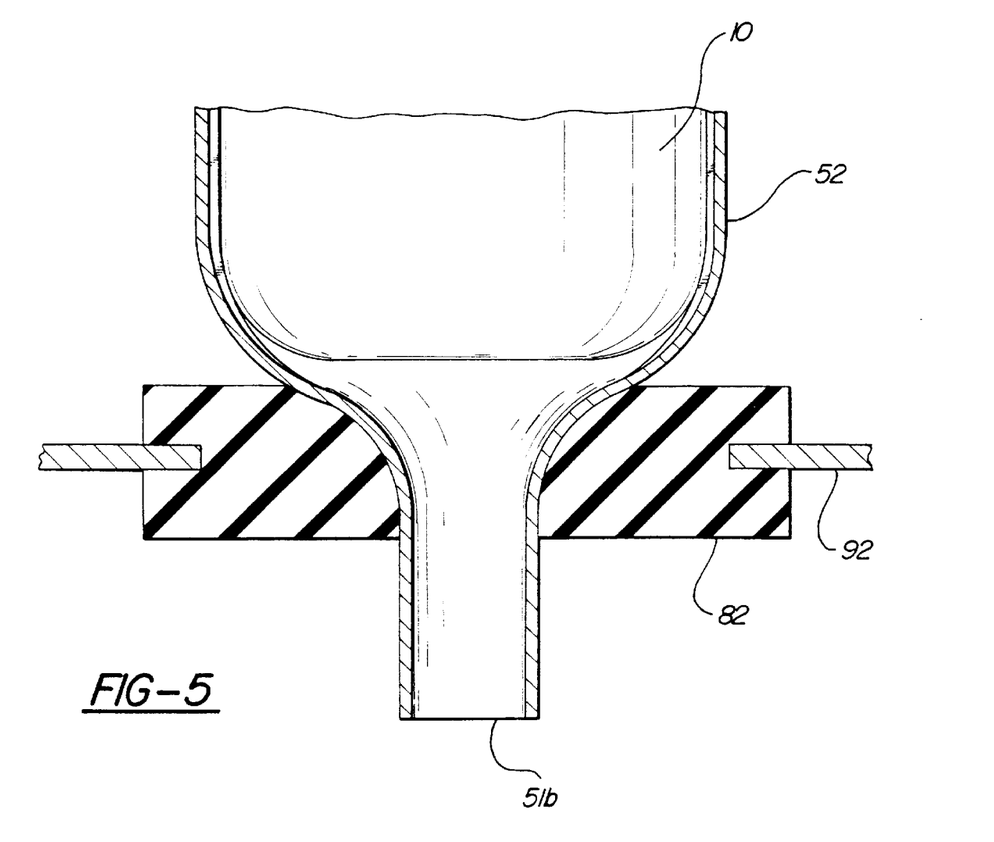
FIG. 5 is an enlarged cross-sectional view of the drain and gasket arrangement shown in FIG.2.

Additional mounting structure can be accommodated by the necked bottom end 51b of the elongated cylindrical sleeve 52. FIG. 2 and FIG. 5 show an embodiment of the present invention in which a gasket 82 surrounds the outer diameter of the necked bottom end 51b. The gasket 82 further engages a surface 92 of the engine compartment. The gasket 82 supports and secures the necked bottom end 51b of the elongated cylindrical sleeve 52, isolating the accumulator 10 from the harsh vibrations of the engine.

The insulating bracket 20 is preferably made from a material having good insulating properties. The sleeve 22, 52, 62, flange 30, 40, and fasteners 78 can be unitarily molded as one piece, or separate integral components as the specific application may necessitate. Any material having good insulating properties and sufficient strength is appropriate such as rubber or plastic.

The insulating and stabilizing properties of the insulating bracket 20, 50, 60 will improve the efficiency and performance of the accumulator 10. Because the accumulator is in a much cooler environment, durability will also improve. The accumulator 10 will be isolated from high heat conditions, harsh vibrations, and excessive moisture because it is shielded and protected by the insulating mounting bracket 20, 50, 60 of the present invention.

While the preferred embodiments of the present invention have been shown and described, it will be apparent to one skilled in the art that modifications may be made without departing from the claims appended hereto.

What is claimed is:

1. A bracket for insulating and mounting a housing of a pressure vessel of an air-conditioning system located within an engine compartment of an automobile, said bracket comprising:

an elongated cylindrical sleeve having an inner surface, an outer surface, a top end and a bottom end, said top end for receiving said pressure vessel, said bottom end for allowing condensate to exit, said top and bottom ends having openings therein, said pressure vessel positioned within said elongated cylindrical sleeve;

said inner surface of said elongated cylindrical sleeve having a corrugation, said corrugation having a first localized area in contact with said housing of said pressure vessel, said corrugation having a second localized area spaced from said housing and defining an air pocket between said insulating bracket and said housing, said air pocket providing a thermal insulation to said pressure vessel; and a mounting flange outwardly projecting from said outer surface of said elongated cylindrical sleeve for mounting said bracket within said engine compartment.

2. A bracket according to claim 1 wherein said elongated cylindrical sleeve comprises a plurality of corrugations.

3. A bracket according to claim 2 wherein said plurality of corrugations each have a radius that is different from a radius of an adjacent corrugation defining distinctly shaped air pockets for insulating said pressure vessel.

4. A bracket according to claim 1 wherein said mounting flange further comprises at least one opening therein for receiving fastening means.

5. A bracket according to claim 1 wherein said bottom end of said elongated cylindrical sleeve further comprises a narrowed elongated neck for draining condensate from said housing of said pressure vessel.

6. A bracket according to claim 5 further comprising a gasket surrounding said narrowed elongated neck for sealing and isolating said bracket within said engine compartment.

7. A bracket according to claim 1 wherein said mounting flange further comprises at least one outwardly projecting extension having a tapered end, said tapered end having a plurality of annular notches for engaging a surface.

8. A bracket according to claim 1 wherein said bracket is made from a material having insulating properties.

9. A bracket for insulating and mounting a housing of a pressure vessel of an air-conditioning system located within an engine compartment of an automobile, said bracket comprising:

an elongated cylindrical sleeve having an inner surface and a bottom end having an opening therein, said pressure vessel positioned within said elongated cylindrical sleeve;

said elongated cylindrical sleeve having an outer periphery having a shape selected from the group consisting of a sinuous shape, a crenulated shape, and a scalloped shape, said outer periphery having a first localized area in contact with said pressure vessel, said outer periphery having a second localized area spaced from said pressure vessel and defining an air pocket providing a thermal insulation to said pressure vessel; and a mounting flange outwardly projecting from said elongated cylindrical sleeve for mounting said bracket within said engine compartment.

10. The bracket according to claim 9 wherein said outer periphery having a shape selected from the group consisting of a sinuous shape, a crenulated shape, and a scalloped shape further comprises a plurality of curved shapes adjacent each other, said curved shapes each having a different radius for defining distinctly shaped air pockets to insulate said pressure vessel.

11. The bracket according to claim 9 wherein said mounting flange further comprises at least one opening therein for receiving fastening means.

12. The bracket according to claim 9 wherein said bottom end of said elongated cylindrical sleeve further comprises a narrowed elongated neck for draining condensate from said outer housing of said pressure vessel.

13. The bracket according to claim 12 further comprising a gasket surrounding said narrowed elongated neck for sealing and isolating said bracket within said engine compartment.

14. The bracket according to claim 9 wherein said mounting flange further comprises at least one outwardly projecting extension having a tapered end, said tapered end having a plurality of annular notches for engaging a surface.

15. The bracket according to claim 9 wherein said insulating bracket is made from a material having insulating properties.

16. A pressure vessel assembly comprising:

an elongated cylindrical sleeve having an inner surface, an outer surface, a top end and a bottom end, said top and bottom ends having openings therein;

said inner surface of said elongated cylindrical sleeve having a corrugation, a pressure vessel positioned within said elongated cylindrical sleeve thereby defining an area between said inner surface of said elongated cylindrical sleeve and said pressure vessel, said corrugation having a first localized area in contact with said pressure vessel, said corrugation having a second localized area spaced from said pressure vessel and defining an air pocket providing a thermal insulation to said pressure vessel; and a mounting flange outwardly projecting from said outer surface of said elongated cylindrical sleeve for mounting a bracket member.

17. A pressure vessel assembly according to claim 16 wherein said elongated cylindrical sleeve comprises a plurality of corrugations.

18. A pressure vessel assembly according to claim 17 wherein each of a plurality of corrugations has a radius that is different from said radius of an adjacent corrugation defining distinctly shaped air pockets providing a thermal insulation to said pressure vessel.

19. A pressure vessel assembly according to claim 16 wherein said mounting flange further comprises at least one opening therein for receiving fastening means.

20. A pressure vessel assembly according to claim 16 wherein said bottom end of said elongated cylindrical sleeve further comprises a narrowed elongated neck for draining condensate from said pressure vessel.

21. A pressure vessel assembly according to claim 20 further comprising a gasket surrounding said narrowed elongated neck for sealing and isolating said elongated cylindrical sleeve.

22. A pressure vessel assembly according to claim 16 wherein said mounting flange further comprises at least one outwardly projecting extension having a tapered end, said tapered end having a plurality of annular notches for engaging a surface.

23. A pressure vessel assembly according to claim 16 wherein said elongated cylindrical sleeve is made from a material having insulating properties.

24. A pressure vessel assembly adapted for use in an air-conditioning system located within an engine compartment of an automobile, said pressure vessel assembly comprising:

an elongated cylindrical sleeve having an inner surface and a bottom end having an opening therein, said elongated cylindrical sleeve having an outer periphery having a shape selected from the group consisting of a sinuous shape, a crenulated shape, and a scalloped shape;

a pressure vessel of said air-conditioning system positioned within said elongated cylindrical sleeve, said outer periphery having localized areas in contact with said pressure vessel mounted within said air-conditioning system, said outer periphery having localized areas spaced from said pressure vessel defining air pockets providing a thermal insulation to said pressure vessel; and a mounting flange outwardly projecting from said elongated cylindrical sleeve for mounting said pressure vessel.

25. A pressure vessel according to claim 24 wherein said outer periphery having a shape selected from the group consisting of a sinuous shape, a crenulated shape, and a scalloped shape further comprises a plurality of curved shapes adjacent each other, said curved shapes each having a different radius for defining distinctly shaped air pockets to insulate said pressure vessel.

26. A pressure vessel assembly according to claim 24 wherein said mounting flange further comprises at least one opening therein for receiving fastening means.

27. A pressure vessel assembly according to claim 24 wherein said bottom end of said elongated cylindrical sleeve further comprises a narrowed elongated neck for draining condensate from said pressure vessel through said opening in said bottom end.

28. A pressure vessel assembly according to claim 27 further comprising a gasket surrounding said narrowed elongated neck for sealing and isolating said elongated cylindrical sleeve within said engine compartment.

29. A pressure vessel assembly according to claim 24 wherein said mounting flange further comprises at least one outwardly projecting extension having a tapered end, said tapered end having a plurality of annular notches for engaging a surface.

30. A pressure vessel assembly according to claim 24 wherein said elongated cylindrical sleeve is made from a material having insulating properties.

* * * * *

UNITED STATES PATENT AND TRADEMARK OFFICE
CERTIFICATE OF CORRECTION

PATENT NO. : 6,041,618
DATED : March 28, 2000
INVENTOR(S) : Patel et al.

It is certified that error appears in the above-identified patent and that said Letters Patent is hereby corrected as shown below:

Column 2,
Line 2, after "al." insert a comma -- , --.

Column 3,
Line 48, delete "stand-still" and insert -- standstill --.

Column 4,
Line 11, delete -- detailing the corrugations on the inner surface of the insulating sleeve --.
Line 22, after "FIG." insert a space --   --.
Line 42, after "21b" insert -- in alternate embodiments 51a and 51b, 61a and 61b, respectively --.
Line 59, delete "crests 23a" and insert -- valleys 23b --.
Line 60, delete "valleys 23b" and insert -- crests 23a --.
Line 63, delete "valley 23b" and insert -- crest 23a --.

Column 5,
Line 1, delete "a" and insert -- an --.
Line 17, delete "crest 53a" and insert -- valley 53b --.
Line 18, delete "valley 53b" and insert -- crest 53a --.
Line 28, delete "FIG.7," and insert -- FIGS. 6 and 7, the cylindrical sleeve 62 of --.
Line 44, delete "stand-still" and insert -- standstill --.
Line 63, delete "supra" and insert -- hereinafter --.

Column 6,
Line 11, delete -- 40 --.
Line 32, after "by" insert -- the --.
Line 33, delete "The" and insert -- As described above, the --.
Line 38, delete "bracket" and insert -- brackets --.
Line 63, delete "bracket" and insert -- brackets --.

UNITED STATES PATENT AND TRADEMARK OFFICE
CERTIFICATE OF CORRECTION

PATENT NO. : 6,041,618
DATED : March 28, 2000
INVENTOR(S) : Patel et al.

It is certified that error appears in the above-identified patent and that said Letters Patent is hereby corrected as shown below:

Column 7,
Line 17, delete -- insulating --.
Line 65, delete "The" and insert -- A --.

Column 8,
Line 5, delete "The" and insert -- A --.
Line 8, delete "The" and insert -- A --.
Line 11, delete -- outer --.
Line 12, delete "The" and insert -- A --.
Line 15, delete "The" and insert -- A --.
Line 19, delete "The" and insert -- A --.
Lines 19 and 20, delete -- insulating --.
Line 27, delete comma "," and insert semi-colon-- ; --.
Line 42, delete "a" first occurrence and insert -- said --.
Line 43, delete "said" and insert -- a --.

Column 9,
Line 18, after "vessel" insert -- assembly --.

Signed and Sealed this

Twenty-second Day of January, 2002

Attest:

*Attesting Officer*

JAMES E. ROGAN
*Director of the United States Patent and Trademark Office*